(12) United States Patent
Shen

(10) Patent No.: US 10,527,488 B2
(45) Date of Patent: Jan. 7, 2020

(54) OPTICAL DETECTING DEVICE HAVING GAS EMISSION AND GAS PRESSURE REDUCTION FUNCTION

(71) Applicant: PixArt Imaging Inc., Hsin-Chu (TW)

(72) Inventor: Chi-Chih Shen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 363 days.

(21) Appl. No.: 15/173,698

(22) Filed: Jun. 5, 2016

(65) Prior Publication Data
US 2017/0322073 A1  Nov. 9, 2017

(30) Foreign Application Priority Data
May 3, 2016  (TW) .............................. 105113738 A

(51) Int. Cl.
*H01J 40/14* (2006.01)
*G01J 1/02* (2006.01)
*G01L 19/00* (2006.01)

(52) U.S. Cl.
CPC ........... *G01J 1/0271* (2013.01); *G01J 1/0252* (2013.01); *G01L 19/0038* (2013.01)

(58) Field of Classification Search
CPC .... G01J 1/0271; G01J 1/0252; G01L 19/0038
USPC .......................................................... 250/239
See application file for complete search history.

(56) References Cited

U.S. PATENT DOCUMENTS

| | | | | |
|---|---|---|---|---|
| 5,097,841 A | * | 3/1992 | Moriuchi | A61B 5/0215 600/488 |
| 2006/0279648 A1 | * | 12/2006 | Senba | G02B 3/14 348/294 |
| 2008/0299013 A1 | * | 12/2008 | Trieu | B01L 9/527 422/400 |
| 2014/0264699 A1 | * | 9/2014 | Ryu | H01L 27/14618 257/434 |

* cited by examiner

*Primary Examiner* — Georgia Y Epps
(74) *Attorney, Agent, or Firm* — Winston Hsu

(57) ABSTRACT

An optical detecting device has gas emission and pressure reduction function and includes a holder, a light penetrating component, a light detecting component, a hole structure, and a. The light penetrating component is disposed on the holder to form an accommodating space whereinside the light detecting component is disposed. The hole structure is formed on the holder to connect with the accommodating space. The waterproofing and ventilating component is disposed on the holder and covers the hole structure to prevent liquid from leaking into the accommodating space via the hole structure. While an inner gas pressure of the accommodating space is decreased, part of the gas is exhausted from the accommodating space via the hole structure and the waterproofing and ventilating component.

9 Claims, 4 Drawing Sheets

OPTICAL DETECTING DEVICE HAVING GAS EMISSION AND GAS PRESSURE REDUCTION FUNCTION

BACKGROUND OF THE INVENTION

1. Field of the Invention

The present invention relates to an optical detecting device, and more particularly, to an optical detecting device having functions of gas emission and pressure reduction.

2. Description of the Prior Art

The wearable device having water-proofing function, heat-proofing function and cold-proofing function is widespread applied to different weather and circumstances. A conventional optical detecting device is disposed inside the wearable device to provide high-precision biological characteristic detection. The conventional optical detecting device provides waterproofing and dustproofing function, such as disposing the optical detecting component inside the holder in an air-tight wrapping manner, to avoid the optical detecting component of the conventional optical detecting device from being polluted by skin furfur, sweat, grease, ambient dust and/or suspension particle. Noise is produced in optical detection information by the foresaid pollution, and precision of the optical detection information is affected accordingly. Although the air-tight holder prevents the optical detecting component from the environmental pollution, the air-tight holder is easily split during the heating process of manufacturing the optical detecting device due to principle of thermal expansion and contraction, so the split holder is polluted by particles and the circuit board inside the holder may be short by liquid leakage. Thus, design of an optical detecting device having waterproofing and ventilation function is an important issue in the related industry.

SUMMARY OF THE INVENTION

The present invention provides an optical detecting device having functions of gas emission and pressure reduction for solving above drawbacks.

According to the claimed invention, an optical detecting device having functions of gas emission and pressure reduction includes a holder, a light penetrating component, a light detecting component, a hole structure and a hole structure. The holder includes a bottom portion and a lateral portion connected with each other. The light penetrating component is disposed on the lateral portion, and an accommodating space is formed between the light penetrating component and the bottom portion. The light detecting component is disposed inside the accommodating space and adapted to receive an optical signal entering the accommodating space through the light penetrating component. The hole structure is disposed on the holder and communicated with the accommodating space. The waterproofing and ventilating component is disposed on the holder to cover the hole structure, and adapted to prevent liquid from leaking into the accommodating space via the hole structure. The gas is partly exhausted from the accommodating space through the hole structure and the waterproofing and ventilating component while an inner gas pressure of the accommodating space is decreased.

According to the claimed invention, an aperture size of the hole structure is ranged between 0.1 mm~1.0 mm, the aperture size of the hole structure is designed according to capacity of the accommodating space and/or material property of the waterproofing and ventilating component, a thickness of the waterproofing and ventilating component is ranged between 10 μm~200 μm, heat-resistant temperature of the waterproofing and ventilating component is greater than 180° C., coverage dimensions of the waterproofing and ventilating component is 5~20 times an aperture size of the hole structure, and the hole structure aligns with a central region of the waterproofing and ventilating component or aligns with a side region of the waterproofing and ventilating component not belonging to the central region.

According to the claimed invention, the waterproofing and ventilating component has low viscosity, the waterproofing and ventilating component is adhered to the holder to prevent the liquid from leaking into the hole structure while the inner gas pressure of the accommodating space is identical with an environmental gas pressure. While inner gas of the accommodating space is expanded, the waterproofing and ventilating component is partly separated from the holder to expose the hole structure so as to exhaust part of the inner gas from the accommodating space. The waterproofing and ventilating component is a semipermeable membrane being liquid-tight and useful for gas separation.

The optical detecting device may merely dispose the light detecting component inside the holder, or dispose the light detecting component and the light emitting component into the holder altogether. The light penetrating component is disposed on the holder to protect internal components of the optical detecting device, and the hole structure is sealed by the waterproofing and ventilating component. The inner gas of the accommodating space can be exhausted from the holder through the hole structure and the waterproofing and ventilating component, which means the optical detecting device has functions of automatic gas emission and pressure reduction via material property of the waterproofing and ventilating component. Therefore, the waterproofing and ventilating component may have the low viscosity to cover and seal the hole structure, the expanded gas inside the accommodating space can lift up the waterproofing and ventilating component to expose the hole structure for gas exhaustion and pressure reduction, and the waterproofing and ventilating component partly separated from the holder is adhered to the holder for keeping seal of the hole structure. Moreover, the waterproofing and ventilating component may be the semipermeable membrane, the inner gas is exhausted from the accommodating space directly through the semipermeable membrane, and the semipermeable membrane is liquid-tight to keep seal of the hole structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
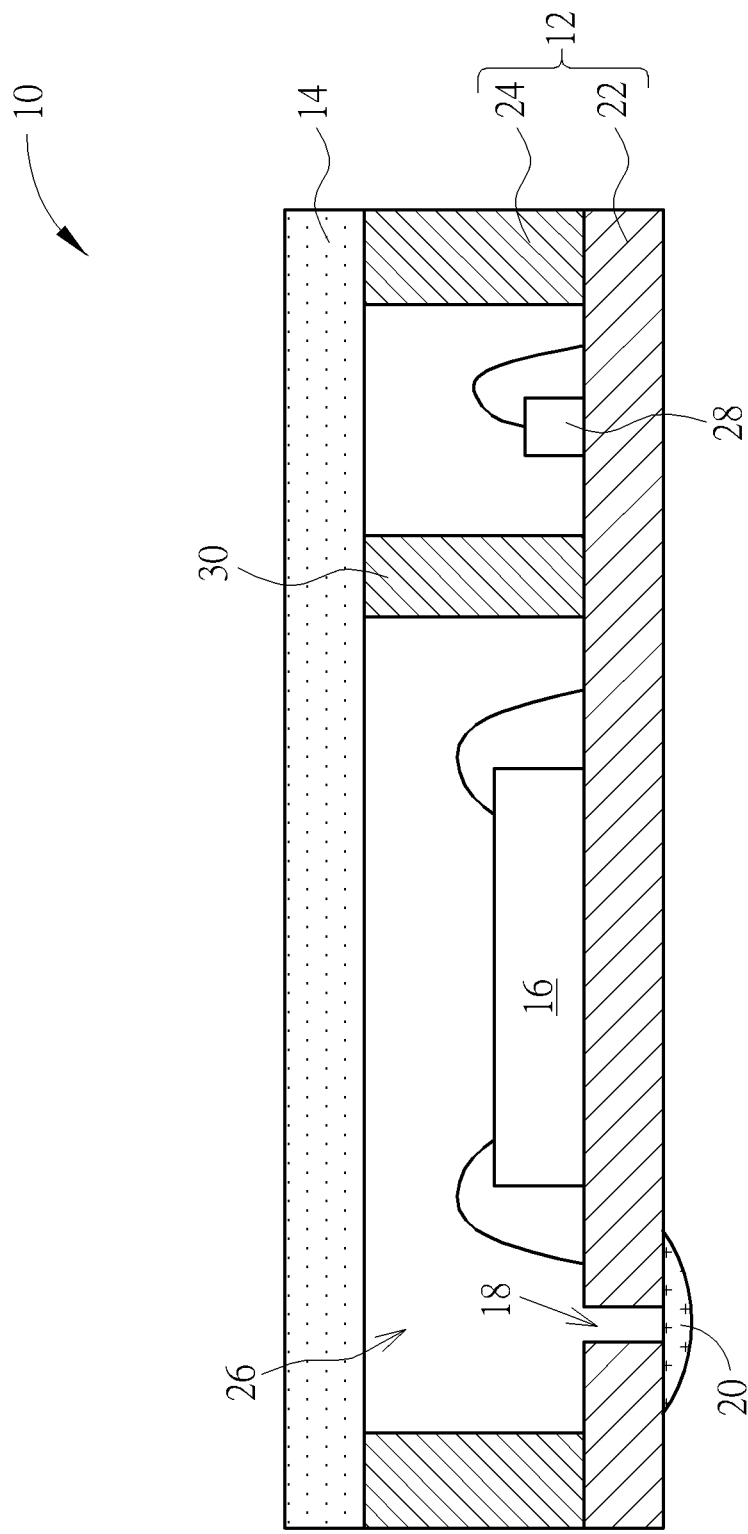
FIG. 1 and FIG. 2 respectively are diagrams of an optical detecting device in different views according to a first embodiment of the present invention.
Figure 2:
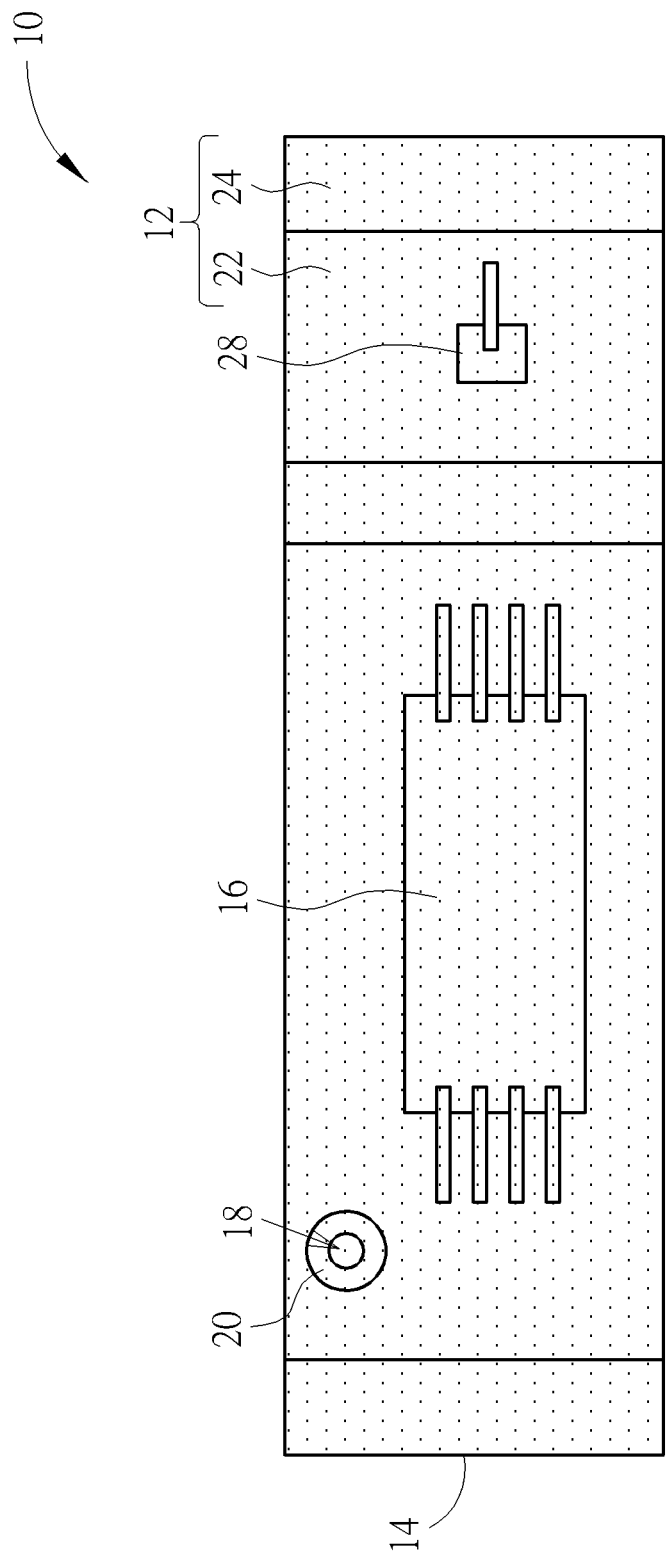

Please refer to FIG. 1 and FIG. 2. FIG. 1 and FIG. 2 respectively are diagrams of an optical detecting device 10 in different views according to a first embodiment of the present invention. The optical detecting device 10 includes a holder 12, a light penetrating component 14, a light detecting component 16, a hole structure 18 and a waterproofing and ventilating component 20. The holder 12 includes a bottom portion 22 and several lateral portions 24, the lateral portions 24 are bent from sides of the bottom portion 22, and the light penetrating component 14 covers ends of the lateral portions 24 opposite to the bottom portion 22, so as to form an accommodating space 26 between the bottom portion 22, the lateral portions 24 and the light penetrating component 14. The light detecting component 16 is disposed inside the accommodating space 26 and adapted to receive an optical signal entering the accommodating space 26 through the light penetrating component 14. Alight emitting component 28 can be optionally disposed inside the holder 12, and accordingly an isolating component 30 is located between the light emitting component 28 and the light detecting component 16. The isolating component 30 is utilized to prevent the optical signal of the light emitting component 28 without being reflected via an external object from being received by the light detecting component 16.

The hole structure 18 is formed on the holder 12 and communicated with the accommodating space 26. The hole structure 18 can be located on the bottom portion 22 or the lateral portion 24, and position of the hole structure 18 depends on design demand. An amount of the hole structure 18 can be one or more, and the hole structures 18 is optionally formed on the bottom portion 22 or the lateral portion 24, and is further optionally distributed over the bottom portion 22 and the lateral portion 24; actual application of the hole structure 18 is not limited to the above-mentioned embodiment and is omitted herein for simplicity. The waterproofing and ventilating component 20 is disposed on the holder 12 to cover the hole structure 18. The waterproofing and ventilating component 20 is utilized to seal the hole structure 18, and to prevent liquid from leaking into the accommodating space 26 via the hole structure 18. An aperture size of the hole structure 18 is preferably ranged between 0.1 mm~1.0 mm, however the aperture size of the hole structure 18 is mainly designed according to capacity of the accommodating space 26, and/or material property of the waterproofing and ventilating component 20. For example, the hole structure 18 owns the large aperture size to avoid violent gas exhaustion while the accommodating space 26 has the large capacity; the hole structure 18 owns the small aperture size to increase exhausting force of the gas passing through the waterproofing and ventilating component 20 while the accommodating space 26 has the small capacity.

In the first embodiment, the waterproofing and ventilating component 20 has low viscosity. While the inner gas pressure of the accommodating space 26 is identical with an environmental gas pressure, the waterproofing and ventilating component 20 is adhered to an outer surface of the holder 12 to prevent the liquid from leaking into the hole structure 18. Heating process is executed during manufacture of the optical detecting device 10, and the inner gas of the accommodating space 26 is expanded in the heating process due to principle of thermal expansion and contraction. While the inner gas pressure of the accommodating space 26 is increased, the gas may be exhausted from the hole structure 18 intermittently, or ejected from the hole structure 18 shortly and continuously. The waterproofing and ventilating component 20 is partly separated from the holder 12 (which means a part of the waterproofing and ventilating component 20 not aligning with the hole structure 18 is adhered to the holder 12), so the hole structure 18 is exposed and the gas inside the accommodating space 26 can be partly exhausted through the exposed hole structure 18.

After the heating process, the inner gas pressure of the accommodating space 26 is identical with the environmental gas pressure, the waterproofing and ventilating component 20, which is partly separated from the holder 12, can be automatically adhered to the holder 12; for example, the waterproofing and ventilating component 20 is recovered to cover the hole structure 18 by gravity, or adhered to the holder 12 though manual operation, or attached to the hole structure 18 while the holder 12 contacts against the external object and the waterproofing and ventilating component 20 is pressed accordingly. The waterproofing and ventilating component 20 having the low viscosity can be the silicone glue or the solder mask, or can be any material with similar functional property. A thickness of the waterproofing and ventilating component 20 is preferably ranged between 10 μm~200 μm. The waterproofing and ventilating component 20 is designed as a thin element to avoid the waterproofing and ventilating component 20 from being partly separated from the holder 12 by the gas ejected out of the hole structure 18 while the inner gas pressure of the accommodating space 26 is imperceptibly varied, and the waterproofing and ventilating component 20 is designed as a thick element to avoid the waterproofing and ventilating component 20 from being detached from the holder 12 by the violent gas pressure, which is resulted from the inner gas pressure of the accommodating space 26 perceptibly varied.

The coverage dimensions of the waterproofing and ventilating component 20 is preferably 5~20 times the aperture size of the hole structure 18, which depends on the thickness of the waterproofing and ventilating component 20. For example, the waterproofing and ventilating component 20 is slightly adherent to the holder 12 while the waterproofing and ventilating component 20 has small coverage dimensions, the gas inside the accommodating space 26 can separate the waterproofing and ventilating component 20 partly from the holder without high exhaustion pressure, so the waterproofing and ventilating component 20 having the small coverage dimensions is suitable for the heating process with micro-scale temperature variation. The waterproofing and ventilating component 20 is heavy-adherent to the holder 12 while the waterproofing and ventilating component 20 has large coverage dimensions. The waterproofing and ventilating component 20 having the large coverage dimensions is suitable for the heating process with macro-scale temperature variation, and the gas exhausted from the accommodating space 26 is powerful to separate the waterproofing and ventilating component 20 from the holder 12 and further able to avoid the waterproofing and ventilating component 20 from being detached from the holder 12. In addition, heat-resistant temperature of the waterproofing and ventilating component 20 is set in accordance with the heating process of manufacturing the optical detecting device 10, and the heat-resistant temperature preferably can be greater than 180° C.

Figure 3:
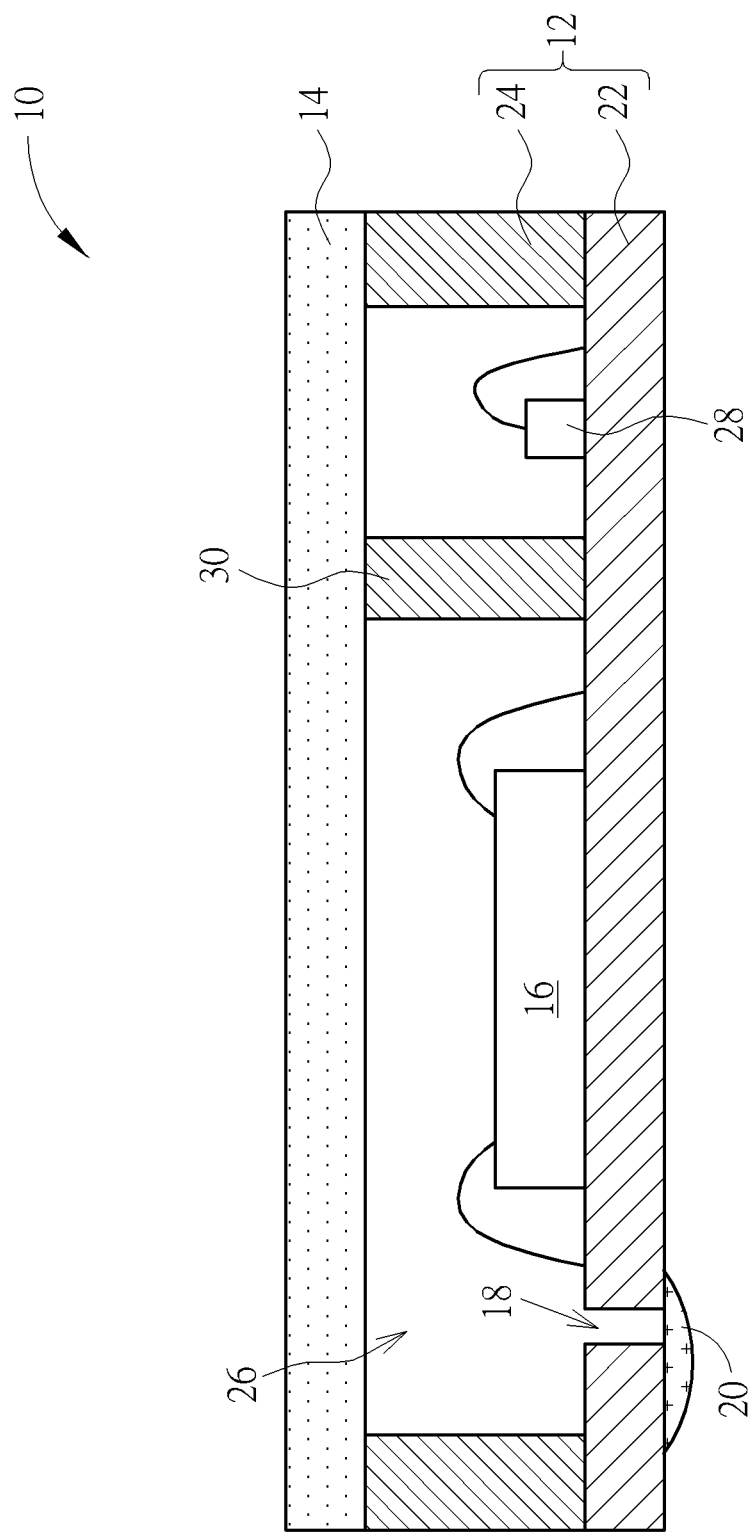
FIG. 3 is a diagram of a hole structure and a waterproofing and ventilating component according to other embodiment of the present invention.

Please refer to FIG. 1 and FIG. 3. FIG. 3 is a diagram of the hole structure 18 and the waterproofing and ventilating component 20 according to other embodiment of the present invention. In the embodiment shown in FIG. 3, elements having the same numerals as ones of the embodiment shown in FIG. 1 have the same structures and functions, and a detailed description is omitted herein for simplicity. Difference between the two embodiments is, the hole structure 18 shown in FIG. 1 aligns with a central region of the waterproofing and ventilating component 20, and the hole structure 18 is at a specific distance from edges of the waterproofing and ventilating component 20 to keep seal of the hole structure 18. The hole structure 18 shown in FIG. 3 aligns with a side region of the waterproofing and ventilating component 20 different from the central region (not belonging to the central region). The right edge of the waterproofing and ventilating component 20 is close to the hole structure 18, so the right edge can be lifted by the inner gas exhausted from the accommodating space 26 through the hole structure 18; the left edge of the waterproofing and ventilating component 20 is far from the hole structure 18, the left edge is heavy-adhered to the holder 12 to ensure that the waterproofing and ventilating component 20 is not detached from the holder 12.

Figure 4:
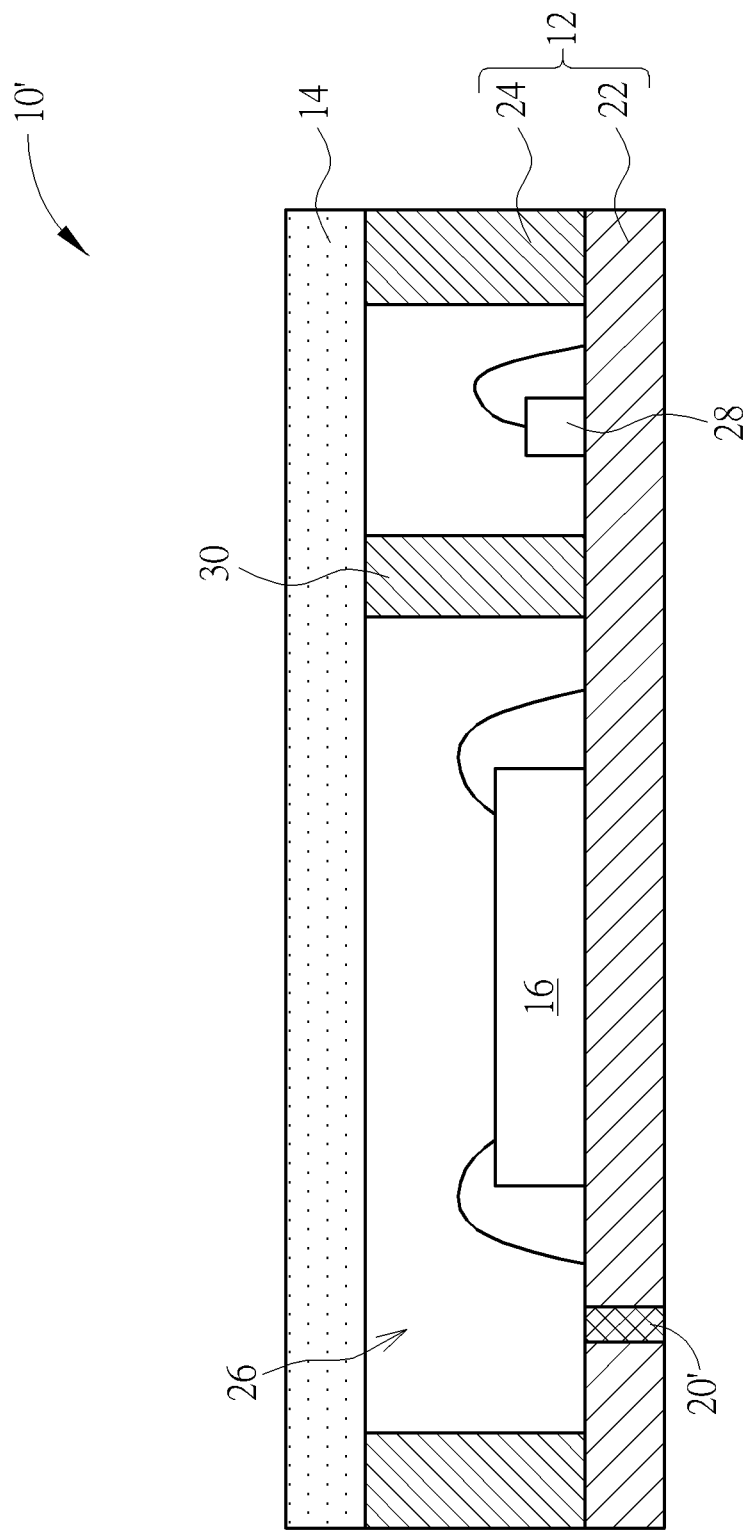
FIG. 4 is a diagram of the optical detecting device according to a second embodiment of the present invention.

Please refer to FIG. 4. FIG. 4 is a diagram of the optical detecting device 10' according to a second embodiment of the present invention. In the second embodiment, elements having the same numerals as ones of the first embodiment have the same structures and functions, and a detailed description is omitted herein for simplicity. The waterproofing and ventilating component 20' of the optical detecting device 10' is a semipermeable membrane, and the semipermeable membrane is filled inside the hole structure 18 to connect with the holder 12. The semipermeable membrane is liquid-tight and useful for gas separation. The waterproofing and ventilating component 20' may have no viscosity, and the heat-resistant temperature is preferably greater than 180° C. to resist the heating process (such as the surface mounting technology) of manufacturing the optical detecting device 10'.

In the present invention, the optical detecting device may merely dispose the light detecting component inside the holder, or dispose the light detecting component and the light emitting component into the holder altogether. The light penetrating component is disposed on the holder to protect internal components of the optical detecting device, and the hole structure is sealed by the waterproofing and ventilating component. The inner gas of the accommodating space can be exhausted from the holder through the hole structure and the waterproofing and ventilating component, which means the optical detecting device has functions of automatic gas emission and pressure reduction via material property of the waterproofing and ventilating component. Therefore, the waterproofing and ventilating component may have the low viscosity to cover and seal the hole structure, the expanded gas inside the accommodating space can lift up the waterproofing and ventilating component to expose the hole structure for gas exhaustion and pressure reduction, and the waterproofing and ventilating component partly separated from the holder is adhered to the holder for keeping seal of the hole structure. Moreover, the waterproofing and ventilating component may be the semipermeable membrane, the inner gas is exhausted from the accommodating space directly through the semipermeable membrane, and the semipermeable membrane is liquid-tight to keep seal of the hole structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detecting device having functions of gas emission and pressure reduction, the optical detecting device comprising:
    a holder, comprising a bottom portion and a lateral portion connected with each other;
    a light penetrating component disposed on the lateral portion, an accommodating space being formed between the light penetrating component and the bottom portion;
    a light detecting component disposed inside the accommodating space and adapted to receive an optical signal entering the accommodating space through the light penetrating component;
    a hole structure disposed on the holder and communicated with the accommodating space, wherein an aperture size of the hole structure is ranged between 0.1 mm~1.0 mm; and
    a waterproofing and ventilating component disposed on the holder to fully cover the hole structure, and adapted to prevent liquid from leaking into the accommodating space via the hole structure, the gas being partly exhausted from the accommodating space through the hole structure and the waterproofing and ventilating component while an inner gas pressure of the accommodating space is increased, wherein coverage dimensions of the waterproofing and ventilating component is 5~20 times an aperture size of the hole structure.

2. The optical detecting device of claim 1, wherein an aperture size of the hole structure is designed according to capacity of the accommodating space, and/or material property of the waterproofing and ventilating component.

3. The optical detecting device of claim 1, wherein a thickness of the waterproofing and ventilating component is ranged between 10 μm~200 μm.

4. The optical detecting device of claim 1, wherein heat-resistant temperature of the waterproofing and ventilating component is greater than 180° C.

5. The optical detecting device of claim 1, wherein the hole structure aligns with a central region of the waterproofing and ventilating component, or aligns with a side region of the waterproofing and ventilating component not belonging to the central region.

6. The optical detecting device of claim 1, wherein the waterproofing and ventilating component has low viscosity, the waterproofing and ventilating component is adhered to the holder to prevent the liquid from leaking into the hole structure while the inner gas pressure of the accommodating space is identical with an environmental gas pressure.

7. The optical detecting device of claim 6, wherein while inner gas of the accommodating space is expanded, the waterproofing and ventilating component is partly separated from the holder to expose the hole structure so as to exhaust part of the inner gas from the accommodating space.

8. The optical detecting device of claim 6, wherein the waterproofing and ventilating component having the low viscosity is silicone glue or solder mask.

9. The optical detecting device of claim 1, wherein the waterproofing and ventilating component is a semipermeable membrane being liquid-tight and useful for gas separation.

* * * * *